United States Patent
Carrion et al.

(10) Patent No.: US 10,189,447 B2
(45) Date of Patent: Jan. 29, 2019

(54) END-PIECE INTENDED TO BE MOUNTED ON A FLEXIBLE SUPPORT AND WIPER INCLUDING THE END-PIECE AND THE FLEXIBLE SUPPORT

(71) Applicant: Valeo Systèmes d'Essuyage, Le Mesnil Saint Denis (FR)

(72) Inventors: Julien Carrion, Charbonnier les Mines (FR); Gilles Petitet, Varennes-Vauzelles (FR); Grégory Kolanowski, Siaugues-Sainte-Marie (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 194 days.

(21) Appl. No.: 15/099,736

(22) Filed: Apr. 15, 2016

(65) Prior Publication Data

US 2016/0304062 A1    Oct. 20, 2016

(30) Foreign Application Priority Data

Apr. 16, 2015   (FR) ...................... 15 53362

(51) Int. Cl.
  *B60S 1/38*   (2006.01)
(52) U.S. Cl.
  CPC .......... *B60S 1/3891* (2013.01); *B60S 1/3889* (2013.01)
(58) Field of Classification Search
  CPC ....................... B60S 1/3886–1/3896
  See application file for complete search history.

(56) References Cited

U.S. PATENT DOCUMENTS

| | | | |
|---|---|---|---|
| 2008/0127442 A1* | 6/2008 | Jarasson | B60S 1/38 15/250.361 |
| 2014/0123430 A1* | 5/2014 | Bex | B60S 1/3881 15/250.361 |
| 2014/0317876 A1 | 10/2014 | Bousset | |

FOREIGN PATENT DOCUMENTS

| | | | |
|---|---|---|---|
| DE | 102013212507 A1 | 12/2014 | |
| FR | 3007717 A1 * | 1/2015 | ............ B60S 1/3891 |
| WO | 2013000650 A1 | 1/2013 | |

OTHER PUBLICATIONS

FR3007717A1 (machine translation), 2015.*
Search Report issued in corresponding French Application No. 1553362; dated Feb. 9, 2016 (7 Pages).

* cited by examiner

*Primary Examiner* — Andrew A Horton
(74) *Attorney, Agent, or Firm* — Osha Liang LLP

(57) ABSTRACT

The invention concerns an end-piece (1) for a motor vehicle glass wiper including at least one flexible support (3) and a wiper blade intended to be pressed against the glass. The end-piece (1) includes a housing (5) adapted to receive an end portion (6) of the flexible support (3). The end-piece (1) includes means (7) for locking the end portion (6) of the flexible support (3) in an engaged position inside the housing (5). The locking means (7) include at least one tongue (107e). The locking means (7) include at least one cavity (107a) that is delimited at least by a first lateral wall (107b), a second lateral wall (107c) and the tongue (107e).

18 Claims, 2 Drawing Sheets

Figure 3:
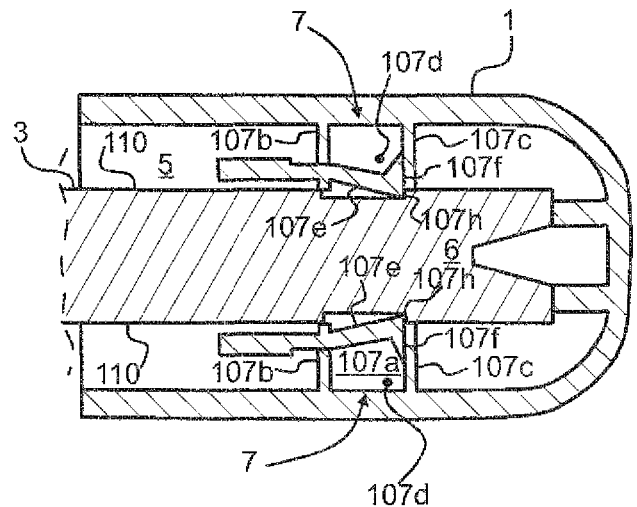

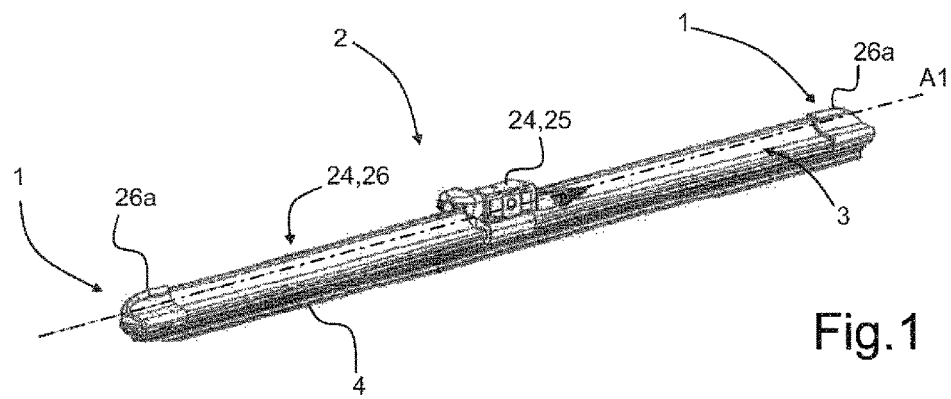
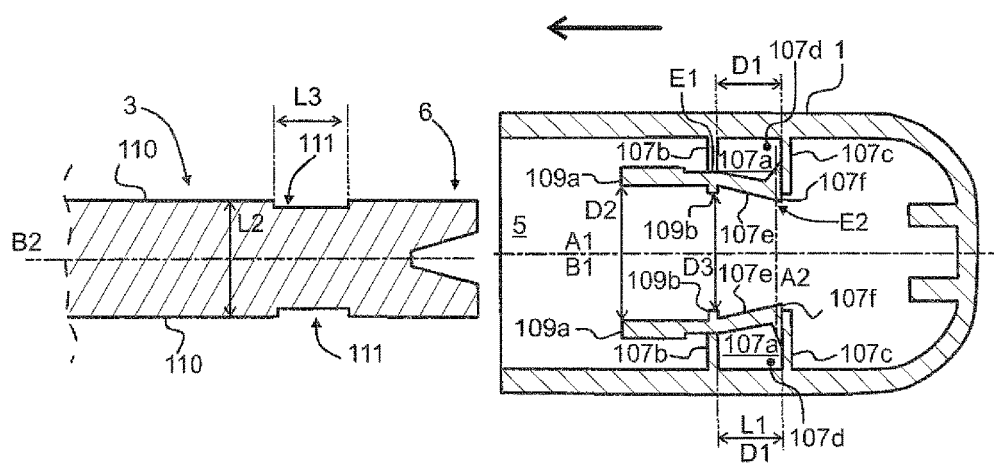
Fig.1
Fig.2

ID-PIECE INTENDED TO BE MOUNTED
ON A FLEXIBLE SUPPORT AND WIPER
INCLUDING THE END-PIECE AND THE
FLEXIBLE SUPPORT

The field of the present invention is that of wipers intended to be fitted to a motor vehicle. The invention more particularly concerns an end-piece intended to be mounted on a flexible support, the end-piece and the flexible support being components of a wiper. The invention is also directed to said wiper and to a wiper system incorporating such a wiper. The invention also relates to a method of assembling the end-piece onto the flexible support.

A motor vehicle is routinely equipped with a wiper system for wiping and washing a windscreen of the motor vehicle in order to prevent interference with the view of their environment that the driver of the motor vehicle has. The wiper system is conventionally driven by an arm effecting an angular to-and-fro movement in front of the windscreen and within the field of view of the driver. The wiper system includes at least one elongate wiper itself carrying a wiper blade made of a flexible material. The wiper blade rubs against the windscreen and evacuates the water out of the field of view of the driver. The wiper is produced in the form either, in a conventional version, of an articulated swing-arm that holds the wiper blade at a number of discrete locations or, in a more recent version commonly known as a "flat blade", of a semi-rigid assembly that retains the wiper blade over all its length. In the second solution, the semi-rigid assembly is attached to an arm of the wiper system by an assembly consisting of a mechanical connector and an adapter. The mechanical connector is a component that is crimped directly onto the wiper and the adapter is an intermediate component for fixing the connector to the arm of the wiper system.

The document WO 2013/000650 proposes a wiper system of the second type in which the semi-rigid assembly includes a flexible support and an end-piece that are fastened together by locking means included in the end-piece.

These locking means have proved unsatisfactory, notably under the severe but common conditions of use to which the wiper is likely to be subjected.

Firstly, it is found that the locking means can be actuated unintentionally, notably by a careless passer-by or user, which in some situations leads to detachment of the end-piece from the wiper.

Secondly, there is not a sufficiently secure mechanical connection between the locking means and the support of the wiper. It is necessary to make this mechanical connection more secure and/or reliable.

Finally, the wiper is liable to be subjected to mechanical stresses that can cause deterioration or even dislocation of the wiper, starting with separation of the end-piece and the flexible support, such demounting of the wiper leading to loss of a spoiler or spoilers with which the wiper is equipped and in the end to destruction of the wiper, for example.

The object of the present invention is to remove the drawbacks described above by proposing a robust end-piece adapted to resist severe conditions of use and notably unintentional actuation of the end-piece, the latter moreover being easy to manufacture and including as few components as possible. The end-piece designed in this way makes the fixing of the locking means relative to the flexible support of a wiper of the present invention more secure and/or reliable, enabling it to resist any intention to damage it on the part of a careless passer-by or user.

An end-piece in accordance with the present invention is an end-piece for a motor vehicle glass wiper including at least one flexible support and a wiper blade intended to be pressed against the glass. The end-piece includes a housing adapted to receive an end portion of the flexible support. The end-piece includes means for locking the end portion of the flexible support in an engaged position inside the housing. The locking means include at least one tongue.

In accordance with the present invention, the locking means include at least one cavity that is delimited by at least a first lateral wall, a second lateral wall and the tongue.

The tongue is advantageously pivotally mounted on the first lateral wall.

The cavity is advantageously in a receptacle for gluing means placed inside the cavity to immobilize the tongue in the locking position. The cavity is adapted to contain a particular quantity of the gluing means. The cavity is also adapted to prevent the gluing means placed in the cavity from spreading outside it.

The cavity is notably delimited by at least one end wall of the end-piece,

The cavity preferably opens in line with an opening through the end-piece.

The tongue preferably extends along a first axis along which the end-piece extends longitudinally.

The first lateral wall and the second lateral wall preferably extend along a second axis that is orthogonal to the first axis along which the end-piece extends longitudinally.

The tongue advantageously includes an abutment whereby the tongue is placed in contact against the second lateral wall.

The abutment is preferably a ramp on which the tongue slides against the second lateral wall.

The abutment preferably extends along the second axis.

The cavity advantageously has a first length measured along the first axis between the first lateral wall and the second lateral wall that is equal to a first distance measured along the first axis between a proximal end and a distal end of the tongue.

The tongue is for example extended by a finger that extends along the first axis and is connected to the tongue via the proximal end.

The tongue is for example equipped with a nipple that extends along the second axis and is connected to the tongue via the proximal end.

A wiper of the present invention is primarily recognizable in that the wiper includes at least one such end-piece and said flexible support which is adapted to be inserted into an entry mouth of the end-piece, the flexible support including at least one notch in a longitudinal edge of the flexible support.

The flexible support is a longitudinal support adapted to be connected to a driving arm via a connector fastened to a central portion of the support.

The notch advantageously has a third length that is equal to the first length and to the first distance.

The notch is advantageously adapted to receive at least part of a heel of the abutment.

A wiper system in accordance with the present invention is a wiper system including such a wiper.

A method in accordance with the present invention is a method of assembling such a wiper, the assembly method including a first step of placing an entry mouth of the end-piece facing the terminal end of the flexible support.

The assembly method advantageously includes a second step of insertion of the flexible support into the end-piece by sliding the longitudinal edges of the flexible support between the fingers of the end-piece, then sliding the longitudinal edges of the flexible support, for example against a nipple or between the nipples of the end-piece, until at least one heel of the tongue, or the heels of the tongues, is/are at least partially accommodated inside the respective notch or notches.

The assembly method advantageously includes a third step of deposition of the gluing means at least inside the cavity to immobilize the tongue, notably in contact against the second lateral wall.

In accordance with a variant, the third step of deposition of the gluing means includes deposition of the gluing means inside the cavity and a housing between the tongue and the flexible support including at least the notch.

These features are such that the means for locking the flexible support and the end-piece are advantageously non-demountable in the sense that the association of the end-piece and the flexible support is robust and permanent under the common but severe conditions of use of the wiper.

Figure 4:
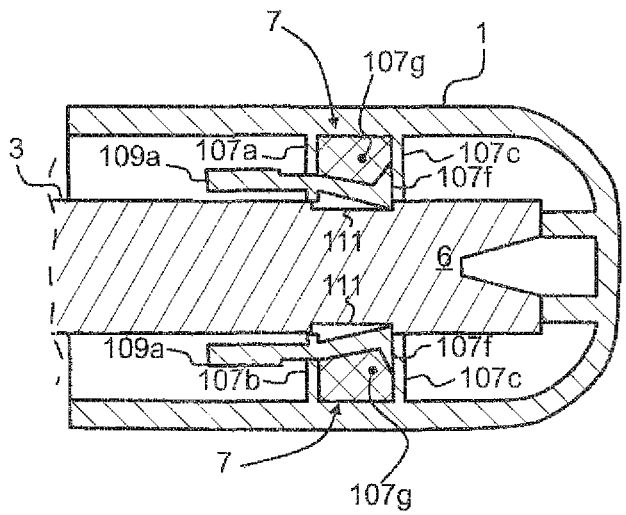
Figure 5:
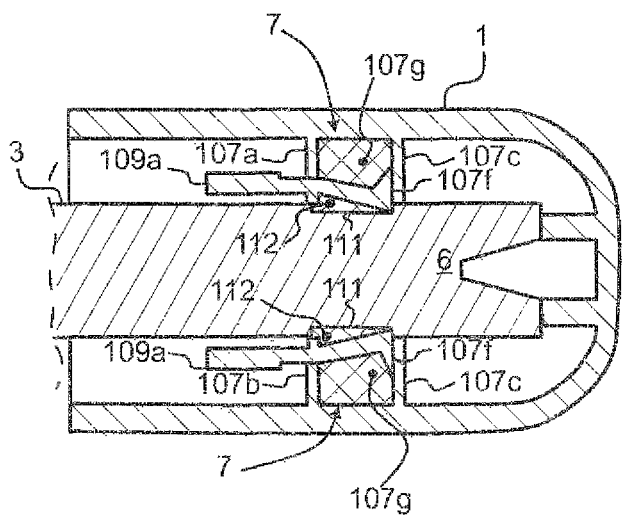

Other features, details and advantages of the invention will emerge more clearly on reading the following description given by way of illustration and in relation to the drawings, in which:

FIG. 1 is a general perspective view of a wiper in accordance with the present invention which is designed to be mounted on a windscreen of a motor vehicle, FIG. 2 is a part-sectional view of an end-piece and a flexible support of the wiper shown by way of example in FIG. 1 on a plane parallel to the plane of the windscreen and illustrating a first step of assembling the end-piece onto the flexible support, FIG. 3 is a part-sectional view of the end-piece and the flexible support of the wiper illustrated by way of example in FIG. 1 on the plane parallel to the plane of the windscreen and illustrating a second step of assembling the end-piece to the flexible support that follows the first step illustrated in FIG. 2, FIG. 4 is a part-sectional view of the end-piece and the flexible support of the wiper illustrated by way of example in FIG. 1 on the plane parallel to the plane of the windscreen and illustrating a preferred third step of assembling the end-piece onto the flexible support that follows the second step illustrated in FIG. 3, FIG. 5 is a part-sectional view of the end-piece and the flexible support of the wiper illustrated by way of example in FIG. 1 on the plane parallel to the plane of the windscreen and illustrating an additional step of assembling the end-piece onto the flexible support that follows or is simultaneous with the second step illustrated in FIG. 4.

It should first be noted that the figures show the present invention in detail for the purposes of executing the invention, said figures of course being able to serve is to define the invention better if necessary.

In the remainder of the description, the term longitudinal refers to the orientation of a wiper or an end-piece in accordance with the invention. The longitudinal direction corresponds to a principal axis of the wiper along which the is latter extends, while lateral orientations correspond to straight line segments concurrent with, that is to say crossing, the longitudinal direction, notably being perpendicular to a first axis along which the wiper extends generally longitudinally in its rotation plane.

In FIG. 1, a wiper 2 in accordance with the present invention is shown in perspective. Such a wiper 2 rubs against a glass of a motor vehicle. The glass is preferably a windscreen equipping a passenger compartment of the motor vehicle. Alternatively, the glass is a rear window of the motor vehicle. In these cases, the function of the wiper 2 is to move water and/or dirt deposited on the windscreen out of the field of view of the driver. In accordance with another example, the glass is for example a glass of a headlight equipping the motor vehicle. In this case, the function of the wiper 2 is to move water and/or dirt deposited on the glass out of an illumination field.

The wiper 2 consists of at least one flexible support 3, otherwise referred to as the longitudinal support, a component 24, a wiper blade 4 and at least one, or even two, end-piece(s) 1 installed on each terminal part of the flexible support 3.

The flexible support 3 can take the form of a single flat and flexible metal strip. Alternatively, the flexible support 3 may take the form of two flexible metal strips each accommodated in a notch provided on either side of the wiper blade 4. In both these cases, in the rest state, such a metal strip is curved in a plane perpendicular to a longitudinal direction of the metal strip. The function of such a single or double metal strip is to distribute along the wiper blade 4 the bearing forces generated by connection means 25 attached to the flexible support 3 at the longitudinal centre of the wiper 2.

The component 24 is one of several types of part constituting the wiper 2. It may be the connection means 25, otherwise referred to as the connector, intended to connect the wiper 2 to a driving arm for rotating the wiper. It may equally be one or more spoilers 26 mounted on the flexible support 3 and the function of which is is to transform the flow of air passing over the wiper 2 into a bearing force that presses the wiper blade 4 against the glass.

In FIGS. 2 to 5, the end-piece 1 includes locking means 7 between the flexible support 3 and the end-piece 1. The locking means 7 are advantageously non-demountable in the sense that the locking means 7 are robust in terms of the common but severe conditions of use of the wiper 2.

The end-piece 1 includes an upper wall 26a that extends the air deflector 26, the upper wall 26a delimiting an opening 5 that can be seen under the wiper 2.

The general locking means 7 advantageously include complementary individual locking means 107a, 107b, 107c, 107d, 107e, 107f and 107g that provide an effective and robust function of clipping the end-piece 1 onto the flexible support 3. In other words, the individual locking means 107a, 107b, 107c, 107d, 107e, 107f and 107g together constitute the general locking means 7 and contribute to robust, permanent and in the end non-demountable retention of the end-piece 1 on the flexible support 3. In other words, it is by a respective function of each of the individual locking means 107a, 107b, 107c, 107d, 107e, 107f and 107g that the general locking means 7 are rendered effective and optimized. The complementary individual locking means 107a, 107b, 107c, 107d, 107e, 107f and 107g together constitute the general locking means 7 and provide a function of optimized retention of the end-piece 1 on the flexible support 3.

The individual locking means 107a, 107b, 107c, 107d, 107e, 107f and 107g include at least one cavity 107a, at least one first lateral wall 107b, at least one second lateral wall 107c, at least one end wall 107d, at least one tongue 107e, at least one abutment 107f and gluing means 107g.

In the variant shown in FIGS. 2 to 5, the individual locking means 107a, 107b, 107c, 107d, 107e, 107f and 107g preferably include two cavities 107a, two first lateral walls 107b, two second lateral walls 107c, two end walls 107d, two is tongues 107e, two abutments 107f and two sets of gluing means 107g.

The two cavities 107a, the two first lateral walls 107b, the two second lateral walls 107c, the two end walls 107d, the two tongues 107e, the two abutments 107f and the two sets of gluing means 107g are preferably arranged face-to-face with one another, being symmetrically arranged on either side of a first median plane B1 of the end-piece 1 that is parallel to a first axis A1 along which the end-piece 1 and advantageously the wiper 2 extend longitudinally.

The first lateral wall 107b and the second lateral wall 107c are arranged along a second axis A2 along which the lateral walls 107b and 107c extend laterally. The second axis A2 is preferably orthogonal to the first axis A1 of longitudinal extension of the wiper 2.

The first lateral wall 107b, the second lateral wall 107c, the end wall 107d, the tongue 107e and the abutment 107f conjointly delimit the cavity 107a. The cavity 107a has the overall shape of a cube of which only one face is open at the level of the opening 5 while the other five faces are blocked by the first lateral wall 107b, the second lateral wall 107c, the end wall 107d, the tongue 107e and the abutment 107f. The face of the cube that is open toward the opening 5 constitutes a passage for depositing the gluing means 107g inside the cavity 107a. The cavity 107a advantageously forms a sealed receptacle for the gluing means 107g.

The tongue 107e is mounted to be mobile by pivoting on the first lateral wall 107b at a proximal end E1 of the tongue 107e, as seen more particularly in FIG. 2. The proximal end E1 advantageously constitutes a junction between the first lateral wall 107b and the tongue 107e.

The abutment 107f is arranged at a distal end E2 of the tongue 107e. The distal end E2 is the end of the tongue 107e that is opposite the proximal end E1 of the tongue 107e. The abutment 107f comes to bear against the second lateral wall 107c. The abutment 107f and the second lateral wall 107c are in close contact with one another so as to form a sealed connection with one another. To optimize further the sealing of such a connection, the abutment 107f is arranged as a ramp that slides against the second lateral wall 107c when the tongue 107e pivots about said junction. To this end, the abutment 107f is preferably parallel to the second axis A2 so that it can slide along the second lateral wall 107c.

These features are such that the cavity 107a is able to receive the gluing means 107g in sealed manner, that is to say without the gluing means 107g spreading outside the cavity 107a. In other words, the cavity 107a is adapted to confine the gluing means 107g between the first lateral wall 107b, the second lateral wall 107c, the end wall 107d, the tongue 107e and the abutment 107f to minimize the quantity of gluing means 107g employed.

Referring more particularly to FIG. 2, the cavity 107a has a first length L1 measured along the first axis A1 between the first lateral wall 107b and the second lateral wall 107c that is equal to a first distance D1 measured along the first axis A1 between the proximal end E1 and the distal end E2.

In accordance with one embodiment, the tongue 107e is extended by a finger 109a that is globally elongate along the first axis A1. The finger 109a is more particularly connected to the tongue 107e via the proximal end E1. The finger 109a constitutes first means for guiding the end-piece 1 when placing the latter on the flexible support 3. To this end, the finger 109a is able to slide along a longitudinal edge 110 of the flexible support 3 to guide the introduction of a terminal end 6 of the flexible support 3 into the opening 5. Such guiding of the sliding of the end-piece 1 on the terminal end 6 of the flexible support 3 has a large clearance because a second distance D2 between two opposite fingers 109a measured along the second axis A2 is greater than a second length L2 measured between two opposite longitudinal edges 110 of the flexible support 3.

In accordance with another embodiment, the tongue 107e is equipped with a nipple 109b that is globally elongate along the second axis A2. The nipple 109b is more particularly connected to the tongue 107e via the proximal end E1. The nipple 109b constitutes second means for guiding the end-piece 1 when placing the latter on the flexible support 3. To this end, the nipple 109b is able to slide along the longitudinal edge 110 of the flexible support 3 to guide the insertion of the terminal end 6 of the flexible support 3 into the opening 5. Such guiding of the sliding of the end-piece 1 on the terminal end 6 of the flexible support 3 has a minimum clearance because a third distance D3 between two opposite nipples 109b measured along the second axis A2 is equal to the second length L2 measured between two opposite longitudinal edges 110 of the flexible support 3.

It will be noted at this stage of the description of the invention that the finger 109a and the nipple 109b constitute ancillary guide means operative prior to locking the end-piece 1 onto the flexible support 3.

A notch 111 is formed on each longitudinal edge 110 of the flexible support 3. The notch 111 is adapted to receive at least part of the tongue 107e in the mutually assembled position of the flexible support 3 and the end-piece 1, as shown in FIGS. 3 and 4. The notch 111 is more particularly adapted to receive at least part of a heel 107h of the tongue 107e, as shown in FIG. 3. The heel 107h is preferably at the end of the abutment 107f. The notch 111 has a third length L3 measured along a second axis of symmetry B2 of the flexible support 3 that is preferably equal to the first length L1 and to the first distance D1, as shown in FIG. 2.

In FIG. 4, the cavity 107a is totally and exclusively filled by the gluing means 107g in order to immobilize the tongue 107e in the locking position in at least one direction opposite to its direction of introduction into the notch 111.

In the FIG. 5 variant, the cavity 107a and the housing 112 between the tongue 107e and the flexible support 3 are filled by the gluing means 107g in order to immobilize the tongue 107e in the locking position. Such a housing 112 advantageously includes the notch 111.

The gluing means 107g comprise any resin, glue or like means, and in any event liquid means able to fill the cavity 107a and/or the housing 112 and then to immobilize the tongue 107e. Such a resin or glue is adapted to solidify hot or cold, by evaporation or vulcanization, in order to immobilize the tongue 107e.

Referring again to FIGS. 2 to 5 in succession, FIG. 2 illustrates a first step of a method of assembling the wiper 2, FIG. 3 represents a second step of the assembly method, FIG. 4 illustrates a first variant of a third step of the assembly method and FIG. 5 illustrates a second variant of the third step of the assembly method, the latter variant being complementary to the first variant of the third step and carried out afterwards or simultaneously.

In FIG. 2, the method of mutual assembly of the flexible support 3 and the end-piece 1 includes the first step of bringing the end-piece 1 face-to-face with the flexible support 3. Said first step more particularly includes bringing an entry mouth of the end-piece 1 face-to-face with the terminal end 6 of the flexible support 3.

In FIG. 3, the method of mutual assembly of the flexible support 3 and the end-piece 1 includes the second step of insertion of the flexible support 3 inside the end-piece 1 by sliding the longitudinal edges 110 of the flexible support 3 between the fingers 109a of the end-piece 1 and then sliding the longitudinal edges 110 of the flexible support 3 between the nipples 109b of the end-piece 1 until the heels 107h of the tongues 107e are at least partly accommodated in the notches 111. Of course, this insertion second step may be carried out with a flexible support 3 including only one notch 111 and an end-piece 1 including only one locking means, i.e. only one tongue 107e. Alternatively, an end-piece 1 including two tongues 107e may be combined with a flexible support 3 including only one notch 111 per terminal portion.

In FIG. 4, the method of mutual assembly of the flexible support 3 and the end-piece 1 includes the first variant of the third step of depositing the gluing is means 107g inside the cavity 107a to immobilize the tongue 107e and advantageously to secure it in contact against the second lateral wall 107c in order to render the assembly of the end-piece 1 and the flexible support 3 robust and permanent, and notably to prevent detachment of the spoilers 26 from the wiper 2 and more generally demounting of the components of the wiper 2.

In FIG. 5, the method of mutual assembly of the flexible support 3 and the end-piece 1 includes the second variant of the third step of depositing gluing means 107g inside the cavity 107a and the housing 112 to fasten and immobilize the tongue 107e in contact against the second lateral wall 107c in order to render robust and permanent the assembly of the end-piece 1 and the flexible support 3 and notably to avoid detachment of the air deflectors 26 from the wiper 2 and more generally demounting of the components of the wiper 2.

The invention claimed is:

1. An end-piece for a motor vehicle glass wiper, comprising:
    a housing adapted to receive an end portion of a flexible support, the housing comprising a first longitudinal wall extending in a direction parallel to the flexible support;
    a first lateral wall protruding from the first longitudinal wall;
    a second longitudinal wall protruding from the first longitudinal wall; and
    a locking means for locking the end portion of the flexible support in an engaged position inside the housing, the locking means comprising at least one tongue,
    wherein the locking means comprises at least one cavity that is delimited by:
       the first longitudinal wall,
       the first lateral wall,
       a second lateral wall, and
       the at least one tongue,
    wherein the at least one cavity is in a receptacle containing gluing means placed inside the cavity to immobilize the at least one tongue in the locking position.

2. The end-piece according to claim 1, wherein the tongue is pivotally mounted on the first lateral wall.

3. The end-piece according to claim 1, wherein the cavity is delimited by at least one end wall of the end-piece.

4. The end-piece according to claim 1, wherein the cavity comprises a cavity opening in line with an opening through the end-piece.

5. The end-piece according to claim 1, wherein the tongue and the end-piece both extend along a first axis.

6. The end-piece according to claim 5, wherein the first lateral wall and the second lateral wall extend along a second axis that is orthogonal to the first axis along which the end-piece extends longitudinally.

7. The end-piece according to claim 6, wherein the tongue includes an abutment whereby the tongue contacts the second lateral wall.

8. The end-piece according to claim 7, wherein the abutment is a ramp on which the tongue slides against the second lateral wall.

9. The end-piece according to claim 8, wherein the abutment extends along the second axis.

10. The end-piece according to claim 6, wherein the tongue is equipped with a nipple that extends along the second axis and is located at a proximal end of the tongue.

11. The end-piece according to claim 5, wherein the cavity has a first length measured along the first axis between the first lateral wall and the second lateral wall that is equal to a first distance measured along the first axis between a proximal end and a distal end of the tongue.

12. A wiper comprising:
    at least one end-piece according to claim 11, wherein said flexible support is adapted to be inserted into an entry mouth of the end-piece, the flexible support including at least one notch in a longitudinal edge of the flexible support.

13. The wiper according to claim 12, wherein the notch has a third length that is equal to the first length and to the first distance.

14. The wiper according to claim 12, wherein the notch is adapted to receive at least part of a heel of an abutment of the tongue.

15. A wiper system including a wiper according to claim 12.

16. The end-piece according to claim 5, wherein the tongue is extended by a finger that extends along the first axis and is connected to the tongue via a proximal end.

17. A method of assembling a wiper, comprising:
    a step of inserting a flexible support into an end-piece by sliding longitudinal edges of the flexible support between fingers of the end-piece until a heel of at least one tongue is at least partly accommodated inside at least one notch on an edge of the flexible support,
    a step of depositing gluing means at least inside a cavity delimited at least by the tongue to immobilize the tongue in contact against a second lateral wall delimiting the cavity.

18. The method according to claim 17, wherein the step of depositing the gluing means includes depositing the gluing means inside the cavity and inside a housing between the tongue and the flexible support including at least the notch.

* * * * *